US010144617B2

(12) United States Patent
Deng et al.

(10) Patent No.: US 10,144,617 B2
(45) Date of Patent: Dec. 4, 2018

(54) ADJUSTING ASPECTS OF A MOVING PLATFORM

(71) Applicant: International Business Machines Corporation, Armonk, NY (US)

(72) Inventors: Yu Deng, Yorktown Heights, NY (US); Quang C. Duong, Tampa, FL (US); Jenny S. Li, Danbury, CT (US); Min Li, San Jose, CA (US); Theresa Tai, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 110 days.

(21) Appl. No.: 15/283,111

(22) Filed: Sep. 30, 2016

(65) Prior Publication Data

US 2018/0093867 A1 Apr. 5, 2018

(51) Int. Cl.
*G06F 7/00* (2006.01)
*B66B 25/00* (2006.01)
*B66B 29/00* (2006.01)

(52) U.S. Cl.
CPC .......... *B66B 25/003* (2013.01); *B66B 29/005* (2013.01)

(58) Field of Classification Search
None
See application file for complete search history.

(56) References Cited

U.S. PATENT DOCUMENTS

| | | | | |
|---|---|---|---|---|
| 8,761,947 B2 | 6/2014 | Wang | | |
| 2007/0062289 A1* | 3/2007 | Heyman | G01G 9/00 73/597 | |
| 2012/0279807 A1* | 11/2012 | Finschi | B66B 1/2458 187/384 | |
| 2016/0368734 A1* | 12/2016 | Zhao | B66B 5/0012 | |
| 2016/0368741 A1* | 12/2016 | Blondiau | B66B 25/00 | |
| 2017/0046575 A1* | 2/2017 | Zhao | G06K 9/00778 | |

FOREIGN PATENT DOCUMENTS

| | | | | |
|---|---|---|---|---|
| CN | 2690362 Y | 4/2005 | | |
| CN | 2701831 Y | 5/2005 | | |
| CN | 201737576 U | 2/2011 | | |
| CN | 103213896 A | 7/2013 | | |
| TW | 201103856 A | 2/2011 | | |
| WO | WO-2015168204 A1 * | 11/2015 | G06K 9/00778 | |

OTHER PUBLICATIONS

Vanderbilt, "Should Cities Install Moving Sidewalks?," Retrieved From http://www.slate.com/articles/news_and_politics/the_hive/2010/07/should_cities_install_moving_sidewalks.html, 2010, pp. 1-3.

(Continued)

*Primary Examiner* — Yolanda R Cumbess
(74) *Attorney, Agent, or Firm* — Zilka-Kotab, P.C.

(57) ABSTRACT

A computer-implemented method according to one embodiment includes monitoring and collecting data associated with one or more users of a moving platform, analyzing the data, identifying a predetermined event, based on the analyzing, and adjusting one or more aspects of the moving platform, based on the predetermined event.

20 Claims, 5 Drawing Sheets

(56) References Cited

OTHER PUBLICATIONS

Liu et al., "Electrorheological Fluid-Actuated Flexible Platform," Applied Physics Letters 88, 2006, pp. 1-4.
Talbot et al., "Falls in Young, Middle-Aged and Older Community Dwelling Adults: Perceived Cause, Environment Factors and Injury," BMC Public Health, 5, 86, 2005, pp. 1-9.
Escalators, Retrieved From http://consumerwatch.com/workplacepublic/escalators/ on Sep. 30, 2016, pp. 1-6.
Bradley, "Why Are Escalators so Danegerous?," Popular Science, Retrieved From http://www.popsci.com/science/article/2011-04/fyi-why-are-escalators-so-dangerous, 2013, pp. 1-2.

* cited by examiner

ADJUSTING ASPECTS OF A MOVING PLATFORM

BACKGROUND

The present invention relates to moving platforms, and more specifically, this invention relates to dynamically adjusting aspects of a moving platform in response to criteria.

Moving platforms such as escalators and moving walkways are essential to modern transportation. However, the use of moving platforms has an associated risk, especially to users meeting certain criteria and users carrying large and/or bulky items.

SUMMARY

A computer-implemented method according to one embodiment includes monitoring and collecting data associated with one or more users of a moving platform, analyzing the data, identifying a predetermined event, based on the analyzing, and adjusting one or more aspects of the moving platform, based on the predetermined event.

According to another embodiment, a computer program product for adjusting one or more aspects of a moving platform comprises a computer readable storage medium having program instructions embodied therewith, wherein the computer readable storage medium is not a transitory signal per se, and where the program instructions are executable by a processor to cause the processor to perform a method comprising monitoring and collecting data associated with one or more users of a moving platform, utilizing the processor, analyzing the data, utilizing the processor, identifying, utilizing the processor, a predetermined event, based on the analyzing, and adjusting, utilizing the processor, one or more aspects of the moving platform, based on the predetermined event.

A system according to another embodiment includes a processor and logic integrated with and/or executable by the processor, where the logic is configured to monitor and collect data associated with one or more users of a moving platform, analyze the data, identify a predetermined event, based on the analysis, and adjust one or more aspects of the moving platform, based on the predetermined event.

Other aspects and embodiments of the present invention will become apparent from the following detailed description, which, when taken in conjunction with the drawings, illustrate by way of example the principles of the invention.

DETAILED DESCRIPTION

Figure 1:
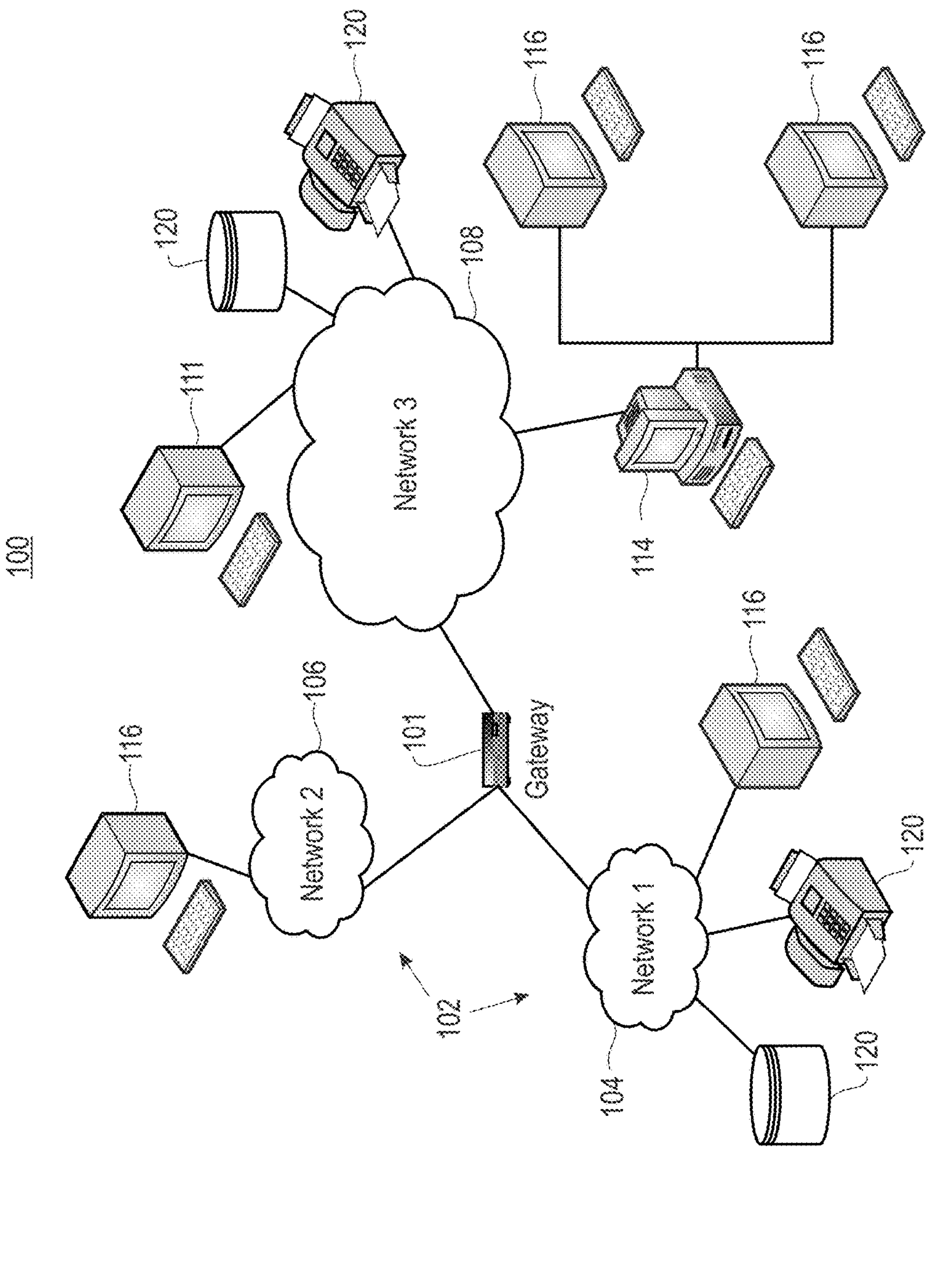
FIG. 1 illustrates a network architecture, in accordance with one embodiment.

The following description discloses several preferred embodiments of systems, methods and computer program products for adjusting aspects of a moving platform. Various embodiments provide a method to identify and analyze users of a moving platform and adjust the moving platform when one or more characteristics of the users meet predetermined criteria.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for adjusting aspects of a moving platform.

In one general embodiment, a computer-implemented method includes monitoring and collecting data associated with one or more users of a moving platform, analyzing the data, identifying a predetermined event, based on the analyzing, and adjusting one or more aspects of the moving platform, based on the predetermined event.

In another general embodiment, a computer program product for adjusting one or more aspects of a moving platform comprises a computer readable storage medium having program instructions embodied therewith, wherein the computer readable storage medium is not a transitory signal per se, and where the program instructions are executable by a processor to cause the processor to perform a method comprising monitoring and collecting data associated with one or more users of a moving platform, utilizing the processor, analyzing the data, utilizing the processor, identifying, utilizing the processor, a predetermined event, based on the analyzing, and adjusting, utilizing the processor, one or more aspects of the moving platform, based on the predetermined event.

In another general embodiment, a system includes a processor and logic integrated with and/or executable by the processor, where the logic is configured to monitor and collect data associated with one or more users of a moving platform, analyze the data, identify a predetermined event, based on the analysis, and adjust one or more aspects of the moving platform, based on the predetermined event.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
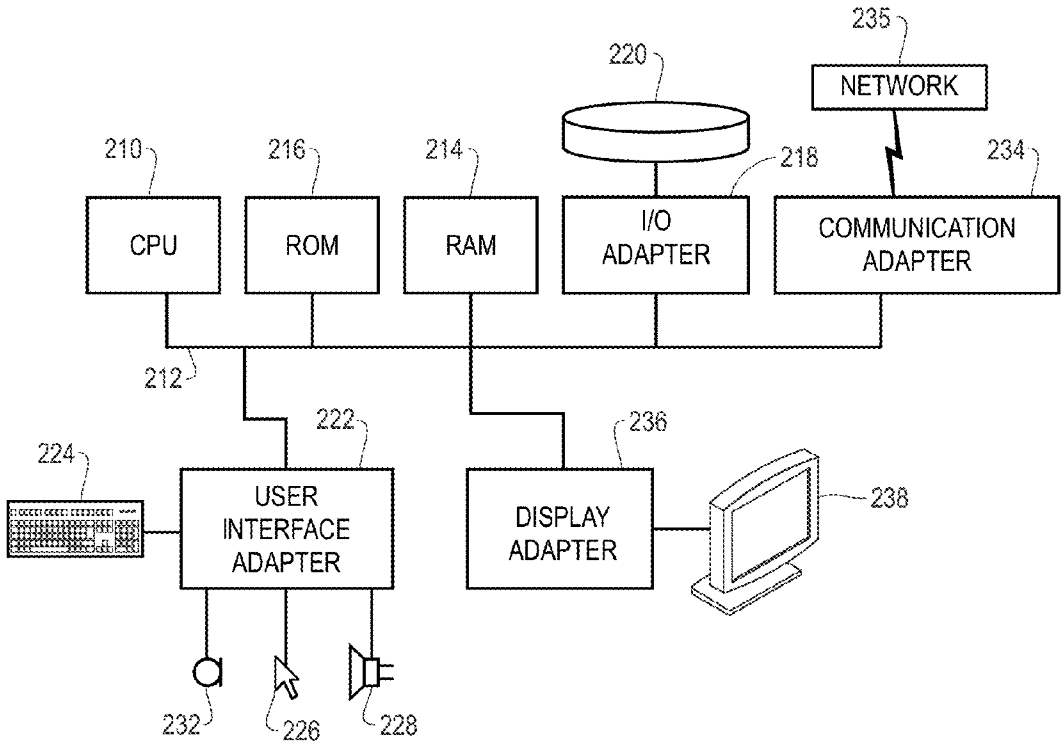
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
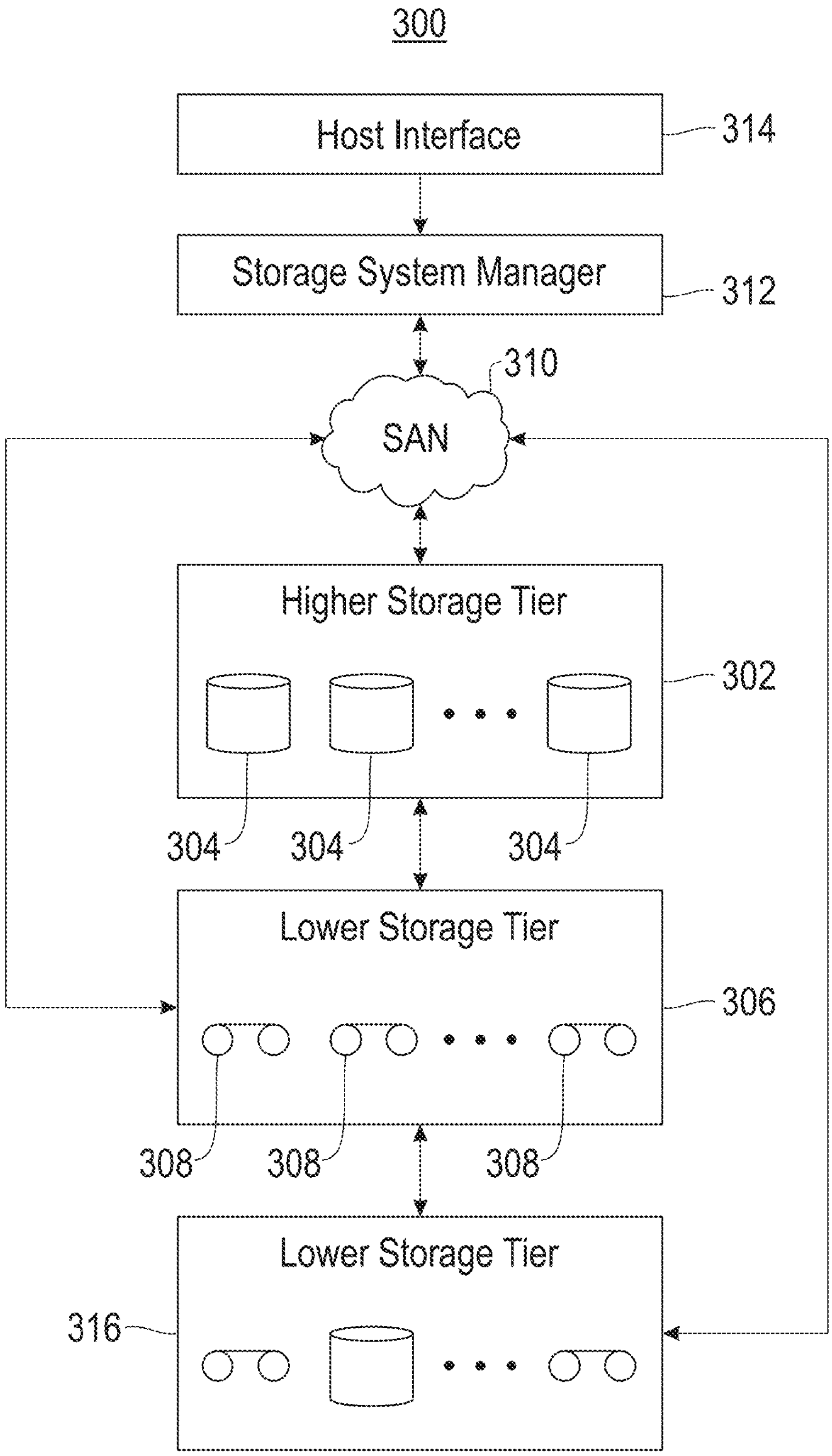
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
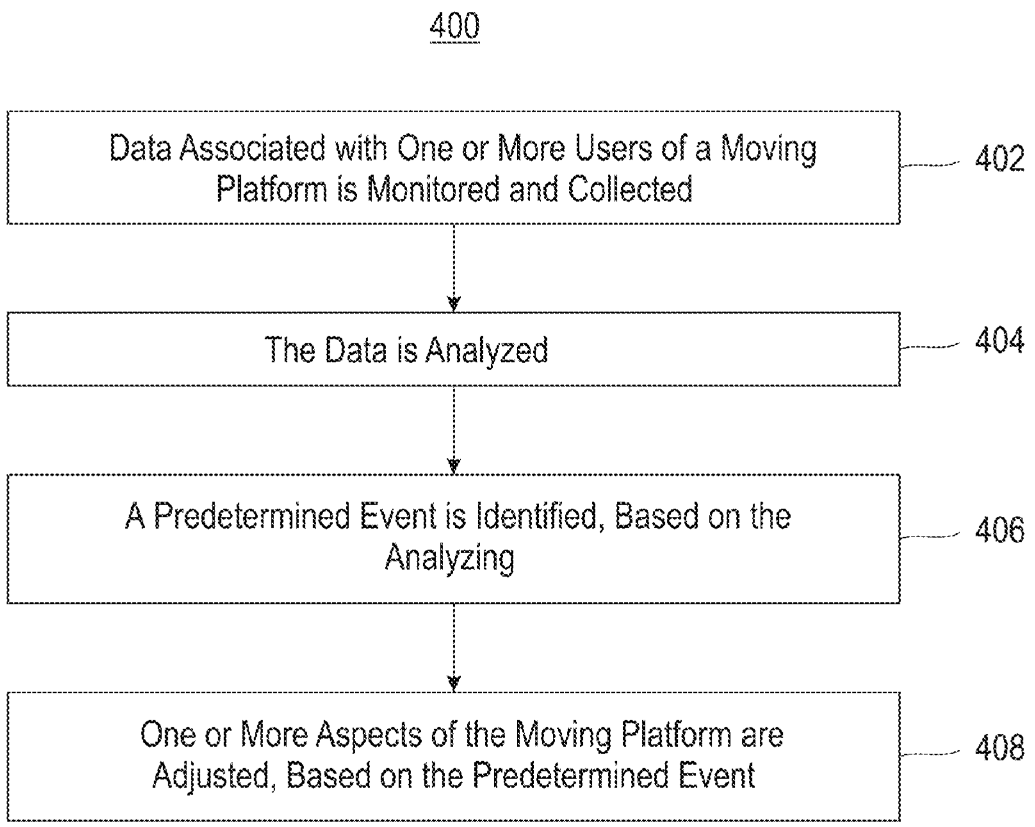
FIG. 4 illustrates a method for adjusting aspects of a moving platform, in accordance with one embodiment.

Now referring to FIG. 4, a flowchart of a method 400 is shown according to one embodiment. The method 400 may be performed in accordance with the present invention in any of the environments depicted in FIGS. 1-3 and 5, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where data associated with one or more users of a moving platform is monitored and collected. In one embodiment, the data may be monitored and collected by a computing device that is communicatively coupled to the moving platform. In another embodiment, the moving platform may include an escalator, a moving walkway, etc. In yet another embodiment, the one or more users may include one or more of passengers on the moving platform, users approaching and/or boarding the moving platform, users departing the moving platform, etc.

Additionally, in one embodiment, the data may be monitored and collected before one or more of the users are on the moving platform, when the one or more users are on moving platform, etc. In another embodiment, the data may be monitored and collected utilizing one or more cameras, one or more sensors (e.g., motion sensors, weight sensors, etc.), etc. In yet another embodiment, the data may include image and/or photographic data of the one or more users. For example, the data may include a photograph or image of a face of the one or more users, a photograph or image of one or more belongings of the one or more users (e.g., a walking apparatus of the user, bags carried, pushed, pulled, or otherwise transported by the user, etc.), etc.

Further, in one embodiment, the data may include a speed of the one or more users (e.g., a speed at which the user is currently moving, etc.). In another embodiment, the data may include a time stamp. For example, the data may include a time that the data was monitored and/or collected.

In addition, as shown in FIG. 4, method 400 may proceed with operation 404, where the data is analyzed. In one embodiment, analyzing the data may include identifying, for each of the one or more users, an age of the user. For example, for each of the one or more users, the age of the user may be determined based on facial analysis of the user, a height of the user, etc. In another embodiment, analyzing the data may include determining an interval of the plurality of users within the moving platform, based on the time stamps associated with the plurality of users, the determined speed of the one or more users, etc. For example, a time of entry onto the moving platform by one or more of the users, as well as the determined speed of the one or more users, may be used to determine a distribution of the users within the moving platform.

Also, in one embodiment, for each of the one or more users, analyzing the data may include determining a weight and/or bulkiness of one or more items being carried or transported by the user based on image data determined for the user and weight sensor data determined for the user. For example, image processing may be performed on image data determined for the user in order to identify a number of packages being held or otherwise transported by the user, and weight sensor data may approximate a weight of the packages.

In addition, in one embodiment, for each of the one or more users, analyzing the data may include determining whether the user has items used for assisting movement (e.g., a walking apparatus such as crutches, a walker, a cane, etc.). For example, for each of the one or more users, image processing may be performed on image data determined for the user in order to identify whether the user has one or more items for assisting movement. In another embodiment, for each of the one or more users, analyzing the data may include identifying a location of the user within the moving platform. For example, for each of the one or more users, image data may be compared to structural data of the moving platform in order to determine a step within the moving platform where the user is currently located.

Further still, as shown in FIG. 4, method 400 may proceed with operation 406, where a predetermined event is identified, based on the analyzing. In one embodiment, the predetermined event may be identified if the results of the analyzing meet one or more predetermined criteria. In another embodiment, the predetermined event may include a potentially hazardous crowding of the one or more users within the moving platform, or a carrying of potentially oversized items by a user. For example, the potentially hazardous crowding may be determined when a distribution and/or interval of users located within the moving platform exceeds a predetermined threshold. In another example, the potentially hazardous crowding may be identified when a calculated probability of collision between users is compared to and exceeds a predetermined threshold.

Further still, in one embodiment, the event may include the heavy utilization of the moving platform by a user having one or more predefined characteristics. For example, such utilization may be identified by when a determined age of the one or more users is greater than or less than one or more predetermined thresholds. In another embodiment, the event may include the transportation of bulky and/or heavy items by a user on the moving platform. For example, such transportation may be identified when it is determined that the determined weight/bulkiness of items being transported by each of the one or more users exceeds a predetermined threshold. In yet another embodiment, the event may include the use of the moving platform by a user needing assistance with movement. For example, such use may be determined by the identification of one or more items used for assisting movement in the possession of the user.

Additionally, as shown in FIG. 4, method 400 may proceed with operation 408, where one or more aspects of the moving platform are adjusted, based on the predetermined event. In one embodiment, the one or more aspects may be adjusted by sending one or more commands from the computing device communicatively coupled to the moving platform to the moving platform itself. In another embodiment, adjusting the one or more aspects of the moving platform may include adjusting a speed of the moving platform. For example, a speed of the moving platform may be reduced when a potentially hazardous crowding of users is determined within the moving platform. In another example, a speed of the moving platform may be reduced when it is determined that a user having predetermined characteristics is using the moving platform, a user transporting heavy/bulky items is using the moving platform, a user needing assistance is using the moving platform, etc.

Additionally, in one embodiment, adjusting the one or more aspects of the moving platform may include softening one or more of a step, an entrance, and an exit to the moving platform. For example, one or more of a step of the moving platform, an entrance platform to the moving platform, and an exit platform of the moving platform may be physically softened when it is determined that a user having predetermined characteristics is using the moving platform, a user transporting heavy/bulky items is using the moving platform, a user requiring assistance is using the moving platform, etc.

Further, in one embodiment, one or more of the step, the entrance platform, and the exit platform may be physically softened utilizing electrorheological fluids integrated into one or more of the step, entrance, or exit. For example, one or more portions of the step, the entrance, and the exit to the moving platform may be constructed using electrorheological fluids that may change density based on the alteration of an electric field. In another example, in response to the identification of the predetermined event, a message may be sent to the moving platform to alter a current or electric field being applied to the electrorheological fluids within one or more of the step, the entrance platform, and the exit platform, in order to soften or stiffen the associated element as needed.

Further still, in one embodiment, adjusting one or more aspects of the moving platform may include visually or audibly outputting a notification to the one or more users of the moving platform. For example, a warning indicating a slowing of the moving platform or a physical softening or hardening of the step, entrance, or exit of the moving platform may be presented to the one or more users on a display or projection of the moving platform. In another example, the warning may include one or more of text, lights, colors, etc. In another example, a warning indicating a slowing of the moving platform or a physical softening or hardening of the step, entrance, or exit of the moving platform may be audibly presented to the one or more users using one or more speakers connected to the moving platform.

In this way, user safety on a moving platform may be increased by preventing movement-based injuries associated with the moving platform.

Figure 5:
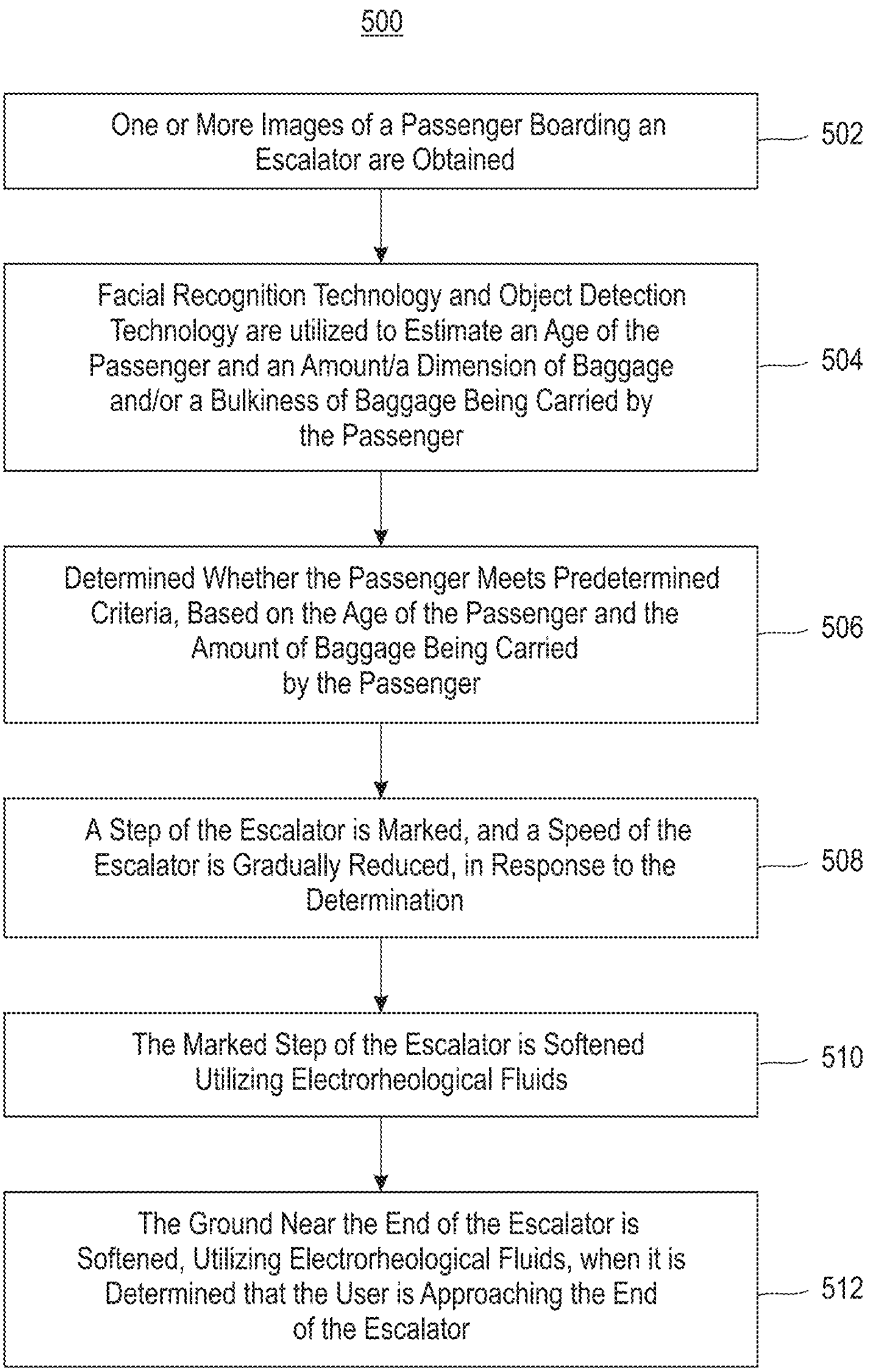
FIG. 5 illustrates a method for dynamically adjusting an escalator, in accordance with one embodiment.

Now referring to FIG. 5, a flowchart of a method 500 for dynamically adjusting an escalator is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where one or more images of a passenger boarding an escalator are obtained. In one embodiment, the images may be obtained utilizing one or more of cameras and projectable surfaces placed at one or more ends of the escalator. In another embodiment, the images of the passenger may be streamed from the one or more cameras to a computing device communicatively coupled to the one or more cameras. In yet another embodiment, the escalator may be located within a shopping mall, within an airport, etc.

Additionally, method 500 may proceed with operation 504, where facial recognition technology and object detection technology are utilized to estimate an age of the passenger and an amount/a dimension of baggage and/or a bulkiness of baggage being carried by the passenger.

Further still, method 500 may proceed with operation 506, where it is determined that the passenger meets predetermined criteria, based on the age of the passenger and the amount of baggage being carried by the passenger. For example, it may be determined whether the passenger has one or more predetermined characteristics, is carrying a large amount of baggage, etc.

Also, method 500 may proceed with operation 508, where a step of the escalator is marked, and a speed of the escalator is gradually reduced, in response to the determination. For example, a location of the user on the escalator may be determined, and a step of the escalator associated with that location may be identified and digitally marked. In another embodiment, a visual or audible alert may be produced when the speed of the escalator is reduced. For example, a visual alert may be displayed (e.g., projected, etc.) onto one or more of handrails, balustrade panels, landing floor plates, and steps of the escalator.

In addition, method 500 may proceed with operation 510, where the marked step of the escalator is softened utilizing electrorheological fluids. For example, electrorheological fluids may be incorporated into each step within the escalator, and the electrorheological fluids within the marked step may be adjusted by applying an electrical current to the step in response to a trigger sent by the computing device to a controller integrated into the escalator. In one embodiment, a visual or audible alert may be produced when the step of the escalator is softened.

Furthermore, method 500 may proceed with operation 512, where the ground near the end of the escalator is softened, utilizing electrorheological fluids, when it is determined that the user is approaching the end of the escalator. In one embodiment, a visual or audible alert may be produced when the ground near the escalator (e.g., where the passenger steps when getting off the escalator, etc.) is softened. In this way, any impact associated with the departure of the user from the escalator may be softened.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
monitoring and collecting data associated with a user of a moving platform, including:
receiving image data including a plurality of images of the user boarding the moving platform, and
receiving weight sensor data determined for the user;
analyzing the data, including:
identifying a number of packages being transported by the user, and determining a bulkiness of the packages, based on the image data,
determining a weight of the packages, based on the weight sensor data,
identifying a step of the moving platform where the user is currently located by comparing the image data to structural data of the moving platform, and
digitally marking the step of the moving platform where the user is currently located;
identifying a predetermined event, based on the analyzing, including:
identifying a transportation of bulky and heavy items by the user on the moving platform in response to determining that the bulkiness of the packages and the weight of the packages exceed a predetermined threshold; and
adjusting a plurality of aspects of the moving platform, based on the predetermined event, including:
visually outputting a first notification to the user indicating a slowing of the moving platform,
gradually reducing a speed of the moving platform,
softening the digitally marked step of the moving platform, and
audibly outputting a second notification to the user indicating a softening of the step of the moving platform where the user is currently located.

2. The computer-implemented method of claim 1, wherein the moving platform includes an escalator or a moving walkway.

3. The computer-implemented method of claim 1, wherein the image data further includes a photograph of a face of the user, a photograph of belongings of the user and a height of the user.

4. The computer-implemented method of claim 1, wherein analyzing the data further includes identifying an age of the user, utilizing facial recognition technology and the image data.

5. The computer-implemented method of claim 1, wherein analyzing the data further includes determining an interval of a plurality of users within the moving platform.

6. The computer-implemented method of claim 1, wherein visually outputting the first notification to the user includes displaying a visual alert on handrails, balustrade panels, landing floor plates, and steps of the moving platform.

7. The computer-implemented method of claim 1, wherein the digitally marked step of the moving platform is constructed using electrorheological fluids that change density based on an alteration of an electric field.

8. The computer-implemented method of claim 1, wherein the predetermined event includes a heavy utilization of the moving platform by a user having a plurality of predetermined characteristics.

9. The computer-implemented method of claim 1, wherein softening the digitally marked step of the moving platform includes sending a trigger to a controller integrated into the moving platform to apply an electrical current to the digitally marked step.

10. The computer-implemented method of claim 1, wherein adjusting the plurality of aspects of the moving platform further includes softening an exit to the moving platform, utilizing electrorheological fluids integrated into the exit, in response to determining that the user is approaching an end of the moving platform.

11. A computer program product for adjusting a plurality of aspects of a moving platform, the computer program product comprising a computer readable storage medium having program instructions embodied therewith, wherein the computer readable storage medium is not a transitory signal per se, the program instructions executable by a processor to cause the processor to perform a method comprising:
monitoring and collecting data associated with a user of a moving platform, utilizing the processor, including:
receiving image data including a plurality of images of the user boarding the moving platform, and
receiving weight sensor data determined for the user;
analyzing the data, utilizing the processor, including:
identifying a number of packages being transported by the user, and determining a bulkiness of the packages, based on the image data,
determining a weight of the packages, based on the weight sensor data,
identifying a step of the moving platform where the user is currently located by comparing the image data to structural data of the moving platform, and
digitally marking the step of the moving platform where the user is currently located;
identifying, utilizing the processor, a predetermined event, based on the analyzing, including:

identifying a transportation of bulky and heavy items by the user on the moving platform in response to determining that the bulkiness of the packages and the weight of the packages exceed a predetermined threshold; and adjusting, utilizing the processor, a plurality of aspects of the moving platform, based on the predetermined event, including:

visually outputting a first notification to the user indicating a slowing of the moving platform, gradually reducing a speed of the moving platform, softening the digitally marked step of the moving platform, and audibly outputting a second notification to the user indicating a softening of the step of the moving platform where the user is currently located.

12. The computer program product of claim 11, wherein the moving platform includes an escalator or a moving walkway.

13. The computer program product of claim 11, wherein the image data further includes a photograph of a face of the user, a photograph of belongings of the user and a height of the user.

14. The computer program product of claim 11, wherein analyzing the data further includes identifying an age of the user, utilizing facial recognition technology and the image data.

15. The computer program product of claim 11, wherein analyzing the data further includes determining an interval of a plurality of users within the moving platform.

16. The computer program product of claim 11, wherein visually outputting the first notification to the user includes displaying a visual alert on handrails, balustrade panels, landing floor plates, and steps of the moving platform.

17. The computer program product of claim 11, wherein the digitally marked step of the moving platform is constructed using electrorheological fluids that change density based on an alteration of an electric field.

18. The computer program product of claim 11, wherein the predetermined event includes a heavy utilization of the moving platform by a user having a plurality of predetermined characteristics.

19. The computer program product of claim 11, wherein softening the digitally marked step of the moving platform includes sending a trigger to a controller integrated into the moving platform to apply an electrical current to the digitally marked step.

20. A system, comprising:

a processor; and logic integrated with the processor, executable by the processor, or integrated with and executable by the processor, the logic being configured to:

monitor and collect data associated with a user of a moving platform, including:

receiving image data including a plurality of images of the user boarding the moving platform, and receiving weight sensor data determined for the user;

analyze the data, including:

identifying a number of packages being transported by the user, and determining a bulkiness of the packages, based on the image data, determining a weight of the packages, based on the weight sensor data, identifying a step of the moving platform where the user is currently located by comparing the image data to structural data of the moving platform, and digitally marking the step of the moving platform where the user is currently located;

identify a predetermined event, based on the analysis, including:

identifying a transportation of bulky and heavy items by the user on the moving platform in response to determining that the bulkiness of the packages and the weight of the packages exceed a predetermined threshold; and adjust a plurality of aspects of the moving platform, based on the predetermined event, including:

visually outputting a first notification to the user indicating a slowing of the moving platform, gradually reducing a speed of the moving platform, softening the digitally marked step of the moving platform, and audibly outputting a second notification to the user indicating a softening of the step of the moving platform where the user is currently located.

* * * * *